United States Patent
Fukushi et al.

(10) Patent No.: US 12,134,669 B2
(45) Date of Patent: Nov. 5, 2024

(54) FLUOROELASTOMERS WITH PERFLUORINATED THERMOPLASTIC FILLERS

(71) Applicant: 3M INNOVATIVE PROPERTIES COMPANY, St. Paul, MN (US)

(72) Inventors: Tatsuo Fukushi, Woodbury, MN (US); Julie A. Baker, St. Paul, MN (US); Yuta Suzuki, Kanagawa (JP); Steffen Vowinkel, Mühldorf am Inn (DE); Justin P. McBride, Woodbury, MN (US); Michael H Mitchell, Edina, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/568,981

(22) PCT Filed: Jun. 30, 2022

(86) PCT No.: PCT/IB2022/056131
§ 371 (c)(1),
(2) Date: Dec. 11, 2023

(87) PCT Pub. No.: WO2023/285909
PCT Pub. Date: Jan. 19, 2023

(65) Prior Publication Data
US 2024/0182615 A1 Jun. 6, 2024

Related U.S. Application Data

(60) Provisional application No. 63/220,907, filed on Jul. 12, 2021.

(51) Int. Cl.
C08F 214/26 (2006.01)
C08L 27/18 (2006.01)

(52) U.S. Cl.
CPC .......... *C08F 214/262* (2013.01); *C08L 27/18* (2013.01); *C08L 2205/025* (2013.01)

(58) Field of Classification Search
None
See application file for complete search history.

(56) References Cited

U.S. PATENT DOCUMENTS

| | | |
|---|---|---|
| 4,713,418 A | 12/1987 | Logothetis et al. |
| 6,172,162 B1 | 1/2001 | Mouri |
| 6,310,141 B1 | 10/2001 | Chen et al. |
| 6,310,142 B1 | 10/2001 | Apostolo et al. |
| 6,395,834 B1 | 5/2002 | Albano et al. |
| 6,734,254 B1 | 5/2004 | Worm et al. |
| 6,884,847 B2 | 4/2005 | Irie et al. |
| 6,992,143 B2 | 1/2006 | Wang |
| 7,019,083 B2 | 3/2006 | Grootaert et al. |
| 7,354,974 B2 | 4/2008 | Takahashi et al. |
| 7,476,711 B2 * | 1/2009 | Takahashi ............... C08J 3/005 525/199 |
| 8,906,821 B2 | 12/2014 | Grootaert et al. |
| 9,458,314 B2 | 10/2016 | Usami |
| 10,557,031 B2 | 2/2020 | Tamon et al. |
| 2013/0109790 A1* | 5/2013 | Fukushi ................. C08K 5/45 524/148 |
| 2016/0122572 A1* | 5/2016 | Zipples ................. C08F 6/16 524/58 |

FOREIGN PATENT DOCUMENTS

| | | |
|---|---|---|
| EP | 0708797 B1 | 2/1998 |
| WO | 2020132203 A1 | 6/2020 |
| WO | 2020132213 A1 | 6/2020 |

OTHER PUBLICATIONS

International Search report for PCT International Application No. PCT/IB2022/056131, mailed on Nov. 21, 2022, 4 pages.
Wang, "Perfluoroelastomer and Fluoroelastomer Seals for Semiconductor Wafer Processing Equipment", Journal of Fluorine Chemistry, 2003, vol. 122, pp. 113-119.

* cited by examiner

*Primary Examiner* — Nicole M. Buie-Hatcher
(74) *Attorney, Agent, or Firm* — Thomas M. Spielbauer

(57) ABSTRACT

Fluoroelastomers containing at least 25 weight percent perfluorinated thermoplastic fillers are described. The perfluorinated thermoplastic fillers comprise a first perfluorinated thermoplastic filler having a first d50 particle size of 10 to 250 nanometers, and a second perfluorinated thermoplastic filler having a second d50 particle size of 5 to 500 micrometers. The first thermoplastic filler may be obtained from a latex while the second thermoplastic filler may be obtained as a dry powder. Methods of making such materials and cured articles prepared from them are also described.

20 Claims, No Drawings

FLUOROELASTOMERS WITH PERFLUORINATED THERMOPLASTIC FILLERS

CROSS REFERENCE TO RELATED APPLICATIONS

This application is a national stage filing under 35 U.S.C. 371 of PCT/IB2022/056131, filed 30 Jun. 2022, which claims the benefit of U.S. Application No. 63/220,907, filed 12 Jul. 2021, the disclosure of which is incorporated by reference in its/their entirety herein.

FIELD

The present disclosure relates to fluoroelastomers containing perfluorinated thermoplastic fillers. The fillers have a multimodal particle size distribution, allowing higher loading levels and improved properties. Articles prepared from such compositions are also described.

SUMMARY

Briefly, in one aspect, the present disclosure provides a composition comprising a curable fluoroelastomer and at least 25% by weight of perfluorinated thermoplastic fillers based on the total weight of the perfluoroelastomer and the perfluorinated thermoplastic fillers: wherein the perfluorinated thermoplastic fillers comprise a first perfluorinated thermoplastic filler having a first d50 particle size of 10 to 250 nanometers as measured according to the Latex Size Procedure, and a second perfluorinated thermoplastic filler having a second d50 particle size of 5 to 500 micrometers meters as measured according to the Powder Size Procedure In other aspects, the present disclosure provides methods of preparing such compositions and cured articles prepared rom such compositions.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Fluoroelastomers, particularly perfluoroelastomers, offer the cleanliness and lack of contamination that are crucial to semiconductor industry while maintaining sealing functionality in aggressive media. Applications requiring resistance to "wet" process chemistry (i.e., acids, bases, amine-based strippers, etc.) include etching, rinsing, cleaning, stripping and copper plating. Applications requiring resistance to "dry" process chemistry (e.g., gases, reactive plasmas, plasmas used for chamber cleaning, etc.) include etching, ashing, chemical vapor deposition, high density plasma chemical vapor deposition and plasma enhanced chemical vapor deposition. Applications requiring thermal resistance include low-pressure chemical vapor deposition (LPCVD), oxidation, diffusion furnace, lamp annealing and rapid thermal processing (RTP). (S. Wang and J. M. Legare, Journal of Fluorine Chemistry 122 (2003) 113-119).

When a fluoroelastomer composition includes a semicrystalline fluoroplastic particle filler, such as microparticles or nanoparticles of polytetrafluoroethylene (PTFE) or perfluoroalkoxy alkanes (PFA), good physical properties, good plasma resistance and excellent purity are achieved. For semiconductor applications, such systems also help to avoid metallic particulation and contamination at a level improved over fluoroelastomers that have inorganic fillers such as metal oxides. Many studies have tried to increase the amount of PFA in a fluoroelastomer compound to improve properties further, e.g., plasma resistance: however, due to poor processability and poor compression set resistance, e.g., O-ring splitting or crashing during test, the loading amount of PFA has been limited to about 20% by weight based on the weight of the fluoroelastomer and PFA.

Surprisingly, the present inventors discovered that fluoroelastomer compositions containing greater than 25% by weight, e.g., at least 30% or even at least 35% by weight PFA can be achieved with combining PFA latex blend and dry PFA mill blend technologies.

Generally, the compositions of the present disclosure comprise an uncured fluoroelastomer, sometimes referred to as a gum. The uncured fluoroelastomer is not particularly limited and includes both highly-fluorinated elastomers (including perfluoroelastomers) and partially-fluorinated elastomers.

As used herein, a "highly fluorinated" polymer is one in which at least 90 mole %, e.g., at least 95 or even at least 99 mole % of the hydrogen atoms of the polymer backbone have been replaced with fluorine atoms. In some embodiments, 0 to 20 mole %, e.g., 5 to 15 mole % of the hydrogen atoms of the polymer backbone may be replaced with chlorine atoms. In some embodiments, these highly fluorinated polymers may include one or more hydrogen-containing end groups or pendant groups, which are not considered to be part of the polymer backbone.

In some embodiments, the highly fluorinated elastomer is a copolymer of tetrafluoroethylene (TFE) and one or more perfluorinated comonomers. In some embodiments, at least one perfluorinated comonomer is a perfluoroalkylvinyl ether (PAVE), including perfluoroalkyl alkoxy vinyl ethers. Suitable PAVEs include perfluoromethyl vinyl ether (PMVE), perfluoroethyl vinyl ether (PEVE), and perfluoropropyl vinyl ether (PPVE-1 and PPVE-2). Exemplary perfluoroalkyl alkoxy vinyl ethers include perfluoro-3-methoxypropyl vinyl ether, $CF_2=CFOCF_2OCF_3$, $CF_2=CFOCF_2OCF_2CF_3$, $CF_2=CFOCF_2OCF_2CF_2OCF_3$, $CF_2=CFOCF_2CF_2OCF_2OCF_2OCF_3$, $CF_2=CFOCF_2CF_2OCF_2OCF_2OCF_3$, and $CF_2=CFOCF_2CF_2OCF_2OCF_2OCF_2OCF_3$. In some embodiments, at least one perfluorinated comonomer is a perfluoroalkyl allyl ether (PAAE), including perfluoroalkyl alkoxy allyl ethers. Suitable PAAEs include perfluoromethyl allyl ether (MA-1), perfluoroethyl allyl ether (MA-2), and perfluoropropyl allyl ether (MA-3).

In some embodiments, at least one perfluorinated comonomer is a perfluorinated alpha-olefin other than TFE, such as hexafluoropropylene (HFP). Additional optional comonomers that may be orient in small amounts include partially fluorinated alpha olefins (e.g., $CH_2=CF_2$, VDF), F and Cl containing olefins such as chlorotrifluoroethylene, and non-fluorinated alpha olefins such as ethylene or propylene.

In some embodiments, the highly-fluorinated elastomer is a perfluorinated elastomers (sometimes referred to as FFKM), i.e., at least 99 mole % or even 100 mole % of the hydrogen atoms of the polymer backbone have been replaced with fluorine or chlorine atoms, preferably fluorine atoms. If chlorine atoms are present, they comprise no greater than 20 mole %, e.g., no greater than 10 mole % based on the total moles of fluorine and chlorine atoms on the polymer backbone. In some embodiments, the perfluorinated elastomer comprises no greater than 5 mol %, e.g., no greater than 1 mole %, or even no greater than 0.01 mole % chlorine atoms based on the total moles of fluorine and chlorine atoms on the polymer backbone.

In some embodiments, fluoroelastomer is a partially-fluorinated elastomer, sometimes referred to as an FKM. The types of FKM includes Type 1, 2, 3, 4, 5 and 6 according to ASTM D1418-17. The partially-fluorinated elastomer includes low temperature fluoroelastomers having glass transition temperature (Tg) from −20° C. to −40° C., −50° ° C., −60° C. even −70° C. In some embodiments, the perfluoroelastomer is a copolymer of tetrafluoroethylene (TFE) and at least one partially-fluorinated comonomer such as vinylidene fluoride ($CH_2=CF_2$, VDF) or vinyl fluoride ($CH_2=CHF$). In some embodiments, additional perfluorinated comonomers such as C3 to C8 perfluorinated alpha-olefins may also be present (e.g., hexafluoropropylene (HFP)). In some embodiments, perfluorinated comonomers may include perfluoroalkyl or perfluoroalkoxy vinyl ethers such as perfluoroalkylvinyl ether (PAVE), including perfluoroalkyl alkoxy vinyl and allyl ethers, such as those described above. In some embodiments, additional partially-fluorinated comonomers may be used. In some embodiments, nonfluorinated comonomers such as ethylene or propylene may also be used. In some embodiments, the partially fluorinated elastomer comprises from 5 mol % to 95 mol % of its interpolymerized units derived from TFE, HFP, and/or chlorotrifluoroethylene (CTFE), from 5 mol % to 90 mol % of its interpolymerized units derived from VDF, ethylene, and/or propylene, and up to 40 mol % of its interpolymerized units derived from a vinyl ether.

Typically, the curable fluoroelastomer will include cure site groups, e.g., cure site groups selected from Br, I, C≡N, and combinations thereof. In some embodiments, cure site groups may be introduced through the use of cure site monomers copolymerized with the TFE and perfluoroalkyl ethers. In some embodiments, the curable perfluoroelastomer comprises 0.5 to mole %, e.g., 1 to 3, or even 1 to 2 mole % of cure site monomers.

Generally, a PFA is a perfluorinated thermoplastic copolymer of at least 98 mole % of tetrafluoroethylene and up to 2 mole % of at least one perfluorinated alkyl or alkoxy ether, i.e., a perfluorinated alkyl vinyl ether, perfluorinated alkoxy vinyl ether, perfluorinated alkyl allyl ether, or a perfluorinated alkoxy allyl ether. In some embodiments, the PFA thermoplastic comprises at least 0.5, e.g., at least 0.8 mol % of the one or more perfluorinated alkyl or alkoxy ethers. Exemplary perfluoroalkyl ethers include perfluoroalkyl vinyl ethers such as PMVE, PEVE, and PPVE: as well as perfluoroalkyl allyl ethers such as perfluoromethyl ally ether (MA-1), perfluoroethyl ally ether (MA-2), perfluoropropyl ally ether (MA-3) and combinations thereof.

PFAs are available as both aqueous latices and dry powders. The PFA particle size in a typical aqueous PFA latex is no greater than 250 nanometers, e.g., no greater than 200 nm, or even no greater than 150 nm. In some embodiments, the PFA particle size in an aqueous PFA latex is at least 10, e.g., at least 20, or even at least 30 nm. In some embodiments, the PFA particle size in an aqueous PFA latex is 10 to 250 nm, e.g., 20 to 200 nm, or even 30 to 150 nm.

In comparison, the PFA particle size in a typical dry powder is significantly larger, e.g., at least 5 micrometers, at least 10 micrometers, or even at least 20 micrometers. In some embodiments, the PFA particle size in the dry powder is no greater than 1000 micrometers, e.g., no greater than 750, 500, 250 or even 150 micrometers. In some embodiments, the PFA particle size in the dry powder is 5 to 500 micrometers, e.g., 10 to 250, or even 20 to 150 micrometers.

The compositions of the present disclosure contain a multimodal size distribution of perfluorinated thermoplastic fillers in the curable perfluoroelastomer. A first peak in the distribution corresponds to the median weight average diameter of the smaller filler particles, with a second peak corresponds the median weight average diameter of the larger filler particles.

Generally, the first peak is at least 10, e.g., at least 20, or even at least 30 nm; and no greater than 250 e.g., no greater than 200, or even no greater than 150 nm. In some embodiments, the first peak is between 10 and 250 nm, e.g., between 20 and 200, or even between 30 and 150 nm. Such sizes may be obtained from latex dispersions of perfluorinated thermoplastic fillers, such as PFA.

Generally, the second peak is at least 5, e.g., at least 10, or even at least 20 micrometers; and no greater than 1000, e.g., no greater than 750, or even no greater than 500 micrometers. In some embodiments, the second peak is between 5 and 500, e.g., between 10 and 250, or even between 20 and 150 micrometers. Such sizes may be obtained from dry powders of perfluorinated thermoplastic fillers, such as PFA.

In some embodiments, the compositions are prepared using the smaller particle sizes obtained from latices with the larger particles obtained from dry powders. By combining these approaches, the total loading of the perfluorinated thermoplastic filler can exceed the 20 wt. % limit typical of latex blended compositions. In some embodiments, the compositions comprise at least 25 wt. %, e.g., at least 30 or even at least 35 wt. % of the perfluorinated thermoplastic fillers, based on the total weight of the perfluoroelastomer and the perfluorinated thermoplastic fillers. In some embodiments, the compositions comprise up 50 wt. %, e.g., up to 55 or even up to 60 wt. % of the perfluorinated thermoplastic fillers, based on the total weight of the perfluoroelastomer and the perfluorinated thermoplastic fillers. For example, in some embodiments, the composition comprises 25 to 60, e.g., 30 to 55, or even 35 to 55 wt. % of the perfluorinated thermoplastic fillers, based on the total weight of the perfluoroelastomer and the perfluorinated thermoplastic fillers.

In some embodiments, the composition contains up to 20 wt. % of a first perfluorinated thermoplastic filler having a size distribution corresponding to the first peak, based on the total weight of the perfluoroelastomer and the perfluorinated thermoplastic fillers. In some embodiments, the composition comprises at least 15 wt. % of the first perfluorinated thermoplastic filler, e.g., 15 to 20 wt. % of a first perfluorinated thermoplastic filler.

In some embodiments, the composition contains at least 10 wt. %, e.g., at least 15 or even at least 20 wt. % of a second perfluorinated thermoplastic filler having a size distribution corresponding to the second peak, based on the total weight of the perfluoroelastomer and the perfluorinated thermoplastic fillers. In some embodiments, the composition comprises at least 10 to 25 wt. % of the second perfluorinated thermoplastic filler, e.g., 15 to 25 wt. % of the second perfluorinated thermoplastic filler.

In some embodiments, the total amount of perfluorinated thermoplastic fillers comprises 30 to 70% by weight of the first perfluorinated thermoplastic filler and 30 to 70% by weight of the second perfluorinated thermoplastic filler, based on the total weight of the perfluorinated thermoplastic fillers. For example, in some embodiments, the perfluorinated thermoplastic fillers comprise 40 to 60% by weight of the first perfluorinated thermoplastic filler and 40 to 60% by weight of the second perfluorinated thermoplastic filler, based on the total weight of the perfluorinated thermoplastic fillers.

In some embodiments, the compositions may contain additional thermoplastic fillers. However, in some embodiments, the total amount of thermoplastic fillers comprises at least 80% by weight, e.g., at 90, at least 95, or even 100% weight of the first and second thermoplastic fillers.

Compositions of the present disclosure may be prepared by a variety of methods. In some embodiments, a first latex of a curable perfluoroelastomer is blended with a second latex of the first perfluoroplastic filler to form a blended latex containing both the curable perfluoroelastomer and the first perfluoroplastic filler. The blended latex may then be processed by known means to remove the water, e.g., one or more steps of coagulation and drying may be used to forma first portion of the composition containing the curable perfluoroelastomer and the first perfluoroplastic filler.

A dry powder of the second perfluoroplastic filler may then be dry-blended, e.g., milled, with the first portion to form the final composition containing the curable perfluoroelastomer and both the first and second perfluoroplastic fillers.

A curative for the perfluoroelastomer may be added during one of the preceding processing steps. However, in some embodiments, the curative is not added until just prior to use, and may be blended with the composition using known means. The curative may be selected based on the nature of the curable perfluoroelastomer, e.g., the cure sites present, and the desired curing methods and conditions.

The curable compositions may be processed according to known techniques including extrusion, press molding, injection molding, and cured according to conventional techniques. Cured articles, including seals an O-rings may be made from the compositions of the present disclosure.

Examples. The materials used in the following examples are described in Table 1.

TABLE 1

Summary of materials used in the preparation of the examples.

| Name | Description |
|---|---|
| ELAST-A | Latex dispersion of a perfluorinated elastomer copolymer comprising 65.7 mol % TFE, 33.0 mol % PMVE, and 1.3 mol % MV5CN, having 72.4 wt. % fluorine content, a Tg of 0° C., and made via aqueous emulsion polymerization and passed through an ion exchange column loaded with a strong base type ion exchange resin available under the trade designation AMBERJET 4200 from Rohm and Hass. |
| ELAST-B | Latex dispersion of a peroxide curable partially-fluorinated elastomer compirsing 21.5 mol % TFE, 25.6 mol % HFP and 52.8 mol % VDF made via aqueous emulsion polymerization with IOFH cure site monomer 0.1 mol % and DIOFB chain transfer agent having 70 wt. % fluorine content, 0.3 wt. % iodine, a Tg of −8° C. and Mooney viscosity of 20. |
| ELAST-C | Latex dispersion of a peroxide curable partially-fluorinated elastomer comprising 11 mol % TFE, 51 mol % VDF and 38 mol % PMVE made via aqueous emulsion polymerization with IOFH cure site monomer 0.1 mol % and DIOFB chain transfer agent having 64.3 wt. % fluorine content, 0.3 wt. % iodine, a glass transition temperature of −30° C., and Mooney viscosity of 20. |
| PFA-1 | Latex dispersion of a thermoplastic copolymer of 98.8 mol % TFE, 0.9 mol % PMVE, and 0.3 mol % MA-3 (having 75.8 wt. % fluorine content, a melting point of 308° C. with an MFI (372° C./5 kg) of 2 and an average particle size (d50) of 80 nanometers. |
| PFA-2 | Dry powder of a copolymer of tetrafluoroethylene (TFE) and perfluoropropyl vinyl ether (PPVE) having 75.8 wt. % fluorine content, a melting point of 308° C. with an MFI (372° C./5 kg) of 3 and an average particle size (d50) of 27.5 micrometers |
| PFA-3 | Dry powder of the same copolymer of tetrafluoroethylene (TFE) and perfluoropropyl vinyl ether (PPVE) as PFA-2 above with a post-fluorinated treatment; and having 75.8 wt. % fluorine content, a melting point of 308° C. with an MFI (372° C./5 kg) of 3 and an average particle size (d50) of 27.5 micrometer. The post-fluorinated treatment was done at 215° C. with a 90 to 10 ratio of $N_2$ to $F_2$ for a total of 300 minutes. |
| Catalyst A | Tetrabutylphosphonium 2-p-toluyl-1,1,1,3,3,3-hexafluoroisopropanoate, can be prepared as described for "TBPTHI2" in U.S. Pat. No. 8,906,821 |
| Catalyst B | 34 wt % Catalyst A on a $SiO_2$ carrier |

Latex Size Procedure. The latex particle size determination was conducted by means of dynamic light scattering with a Malvern Zetasizer Nano S (Malvern, Worcestershire, UK) following DIN ISO 13321:2004-10. The reported average particle size diameter is the d50. Prior to the measurements, the polymer latexes as yielded from the polymerizations were diluted with 0.01 mol/L NaCl solution. The measurement temperature was 25° C. in all cases.

Powder Size Procedure. The dry powder particle size determination (d50) was conducted by means of dynamic light scattering method using a Malvern Mastersizer 3000 (Malvern, Worcestershire, UK) according to ISO 13320 (2009).

Mooney Viscosity Method. The Mooney viscosity values were measured in a similar manner as ASTM D 1646-06 Type A by a MV2000 instrument (available from Alpha Technologies, Ohio) using large rotor (ML 1+10) at 121° C. Results are reported in Mooney units.

Cure Rheology. Cure rheology tests were carried out using uncured, compounded samples using a rheometer marketed under the trade designation PPA 2000 by Alpha technologies, Akron, OH, in accordance with ASTM D 5289-93a at 177 or 188° C., 12 or 15 minute elapsed time, and a 0.5 degree arc. Both the minimum torque ($M_L$) and highest torque attained during a specified period of time when no plateau or maximum torque ($M_H$) was obtained were measured. Also measured were the time for the torque to increase 2 units above $M_L$ (ts'2), the time for the torque to reach a value equal to $M_L+0.1(M_H-M_L)$, (t10), the time for the torque to reach a value equal to $M_L+0.5(M_H-M_L)$, (t50), and the time for the torque to reach $M_L+0.9(M_H-M_L)$, (t90).

Melt-flow index (MFI). Melt-flow index (MFI), reported in g/10 min, was measured according to DIN EN ISO 1133-1:2012-03 at a support weight of either 2.16, 5.0, or 21.6 kg. The MFI was obtained with a standardized extrusion die of 2.1 mm diameter and a length of 8.0 mm. Unless otherwise noted, a temperature of 372° C. was applied.

Glass transition temperature (Tg). Glass transition temperature (Tg) was measured according to ASTM D3418 by differential scanning calorimetry (DSC) using a TA Instruments Q200 from TA Instruments, New Castle, Del. Conditions of measurement were: −80° C. to 50° C. at 10° C. per minute.

Curing for perfluoroelastomer samples. O-rings (214, AMS AS568) or sheets (7.62 cm×15.24 cm with 2 mm thickness) were molded at 188° C. for 10 minutes. The press-cured O-rings or sheets were post-cured using following step cure procedure. The first step cure started at room temperature and was ramped to 250° C. for 2 hours. It was held at 250° C. for 7 hours. The second step cure started at 250° C. and was ramped to 300° C. for 2 hours. It was held at 300° C. for 2 hours. The third step cure started at 300° C. and was ramped to 325° C. for 0.25 hours. It was held at 325° C. for 0.25 hours. Then cooling step started at 325° C. and was cooled to room temperature for 2 hours.

Curing for partially-fluorinated elastomer samples. O-rings (214, AMS AS568) or sheets (7.62 cm×15.24 cm with 2 mm thickness) were molded at 177° C. for 15 minutes. The press-cured O-rings or sheets were post-cured at 230° C. for 4 hours.

Compression Set Procedure. The post-cured O-rings were tested for compression set for 70 hours at 200° C. or 300° C. in accordance with ASTM D 395-03 Method B and ASTM D 1414-94 with 25% initial deflection. Results are reported as percentages.

Plasma Resistance Procedure. The post-cured O-rings were tested for plasma resistance using Trion Phamtam III (available from Trion, Clear Water, FL, US). A half of the O-ring was placed in the plasma chamber at a center between the RF electrodes and the plasma irradiation was carried out under the total 150 sccm gas flow of oxygen or NF3. The pressure was 100 m Torr and RF power for RIE (Reactive Ion Etching) was 300 W. The temperature of Electrostatic chuck (ESC) was set at 200° C. After 30 minutes exposure to plasma the weight loss was measured and calculated using the equation below.

$$\text{Weight loss (\%)} = \frac{\text{weight before plasma exposure} - \text{weight after plasma exposure}}{\text{weight before plasma exposure}} \times 100\%$$

Physical Properties. Tensile strength at break, elongation at break, and modulus at 100% elongation were determined according to ASTM D 412 using samples cut from the corresponding post-cured sheets using punch Die D according ASTM D 412. Shore A Hardness was measured using ISO 7619-1 with a Type A-2 Shore Durometer. Post-cured sheets (procedure see above) of the curable composition were used for physical property determination. All specimens were returned to ambient temperature before testing.

Samples Prepared From A Perfluoroelastomer (ELAST-A)

Portion 1. The latex of ELAST-A was blended with the latex of PFA-1 to produce a blended latex containing 80/20 weight ratio of the perfluoroelastomer to the perfluorinated thermoplastic. The blended latex was coagulated using a 5 wt. % aqueous solution of HNO3, washed with deionized water and oven dried at 115° C. for 16 hours to form "Portion 1") used to prepare the following examples.

Example 1 (EX-1) was prepared by combining 100 grams of Portion 1 with 15 grams of PFA-2, 0.63 grams of Catalyst A and 0.21 grams of Catalyst B and milling the composition on a two roll mill. The resulting composition is summarized in Table 2.

Example 2 (EX-2) was prepared in the same manner, except 25 grams of PFA-2 were used. The resulting composition is summarized in Table 2.

Portion 2. The latex of PFE-A was coagulated using a 5 wt. % aqueous solution of HNO3, washed with deionized water and oven dried at 115° C. for 16 hours to form "Portion 2" used to prepare the following comparative example.

Comparative Example 1 (CE-1) was prepared by combining 100 grams of Portion 2 with 30 grams of PFA-2, 0.63 grams of Catalyst and 0.21 grams of Catalyst B and milling the composition on a two roll mill. The resulting composition is summarized in Table 2.

TABLE 2

Compositions and test results using a perfluorinated elastomer (ELAST-A).

|  | EX-1 | EX-2 | CE-1 |
|---|---|---|---|
| Formulation |  |  |  |
| ELAST-A (from latex) | 80 g | 80 g | 70 g |
| PFA-1 (from latex) | 20 g | 20 g | 0 |
| PFA-2 (from powder) | 15 g | 25 g | 30 g |
| Catalyst A | 0.63 g | 0.63 g | 0.55 g |
| Catalyst B | 0.21 g | 0.21 g | 0.18 g |
| Total weight of ELAST and PFA | 115 g | 125 g | 100 g |
| Weight % PFA based on total weight |  |  |  |
| PFA-1 | 17.4% | 16% | 0 |
| PFA-2 | 13.0% | 20% | 30% |
| Total PFA-1 + PFA-2 | 30.4% | 36% | 30% |
| Wt. ratio PFA-1:PFA-2 | 57:43 | 44:56 | 0:100 |
| Weight % fluorine of ELAST and PFA | 73.4 | 73.6 | 73.4 |

TABLE 2-continued

Compositions and test results using a perfluorinated elastomer (ELAST-A).

|  | EX-1 | EX-2 | CE-1 |
|---|---|---|---|
| Cure rheology 10 min.@188° C. | | | |
| ML (dNm) | 4.2 | 5.7 | 6.7 |
| MH (dNm) | 17.1 | 20.3 | 21.2 |
| D torque (dNm) | 12.9 | 14.6 | 14.5 |
| Ts'2 (min) | 0.9 | 0.7 | 0.6 |
| T50 (min) | 1.6 | 1.3 | 1.1 |
| T90 (min) | 4.2 | 3.8 | 3.3 |
| tan d ML | 0.54 | 0.54 | 0.49 |
| tan d MH | 0.069 | 0.080 | 0.075 |
| Typical Physical Properties | | | |
| Tensile at break, MPa | 15.0 | 15.3 | 9.9 |
| 100% Modulus, MPa | 4.7 | 5.7 | 5.1 |
| Elongation at break, % | 257 | 248 | 228 |
| Hardness, Shore A | 74 | 76 | 76 |
| Specific gravity | 2.076 | 2.084 | 2.070 |
| Compression Set | | | |
| 70 hrs@200° C. (25% deflection) | 16 | 16 | 14 (Split 1 of 2) |
| 70 hrs@300° C. (25% deflection) | 55 | 58 | All split |
| Plasma resistance | | | |
| $NF_3$ plasma weight loss (%) | 2.1 | 2.0 | 2.1 |
| $O_2$ plasma weight loss (%) | 0.46 | 0.44 | 0.38 |

Samples Prepared from a Partially-Fluorinated Elastomer (ELAST-B)

Portion 3. The latex of ELAST-B was blended with the latex of PFA-1 to produce a blended latex containing 80/20 weight ratio of the partially-fluorinated elastomer to the perfluorinated thermoplastic. The blended latex was coagulated using a 1.25 wt. % aqueous solution of $MgCl_2$, washed with deionized water and oven dried at 115° C. for 16 hours to form "Portion 3" used to prepare the following examples.

Example 3 (EX-3) was prepared by combining 100 grams of Portion 3 with 25 grams of PFA-2, 3 grams of a co-agent (1,3,5-Triallyl-1,3,5-triazine-2,4,6(1H,3H,5H)-trione (purity: 98%) available from Nippon Kasei, Tokyo Japan) and 1 gram of a peroxide curative (2,5-dimethyl-2,5-di(t-butylperoxy)-hexane (DBPH) (purity: 90%) available from Sigma-Aldrich, Milwaukee, WI, USA), and milling the composition on a two roll mill. The resulting composition in summarized in Table 3.

Example 4 (EX-4) was prepared in the same manner, except 25 grams of PFA-3 were used. The resulting composition is summarized in Table 3.

Example 5 (EX-5) was prepared in the same manner, except 60 grams of PFA-2 were used. The resulting composition is summarized in Table 3.

Example 6 (EX-6) was prepared in the same manner, except 60 grams of PFA-3 were used. The resulting composition is summarized in Table 3.

Comparative Example 2 (CE-2) was prepared in the same manner, except no PFA was used. The resulting composition is summarized in Table 3.

TABLE 3

Compositions and test results using a partially fluorinated elastomer (ELAST-B).

|  | EX-3 | EX-4 | EX-5 | EX-6 | CE-2 |
|---|---|---|---|---|---|
| Formulation | | | | | |
| ELAST-B (from latex) | 80 | 80 | 80 | 80 | 80 |
| PFA-1 (from latex) | 20 | 20 | 20 | 20 | 20 |
| PFA-2 (from powder) | 25 | — | 60 | — | — |
| PFA-3 (from powder) | — | 25 | — | 60 | — |
| Co-agent | 3 | 3 | 3 | 3 | 3 |
| Peroxide curative | 1 | 1 | 1 | 1 | 1 |
| Weight % PFA based on total weight | | | | | |
| PFA-1 (%) | 16 | 16 | 16 | 16 | 20 |
| PFA-2 (%) | 20 | 0 | 34 | 0 | 0 |
| PFA-3 (%) | 0 | 20 | 0 | 34 | 0 |
| Total PFA-1 + (PFA-2 or PFA-3) (%) | 36 | 36 | 50 | 50 | 20 |
| Wt. ratio PFA-1:(PFA-2 or PFA-3) | 44:56 | 44:56 | 32:64 | 32:64 | 100:0 |
| Weight % fluorine of ELAST and PFA | 72.0 | 72.0 | 72.8 | 72.8 | 71.1 |
| Cure rheology 15 min.@177° C. | | | | | |
| ML (dNm) | 0.7 | 1.3 | 2.0 | 3.3 | 0.4 |
| MH (dNm) | 23.8 | 25.4 | 36.7 | 36.5 | 15.5 |
| D torque (dNm) | 23.1 | 24.1 | 34.7 | 0.79 | 15.1 |

TABLE 3-continued

Compositions and test results using a partially fluorinated elastomer (ELAST-B).

|  | EX-3 | EX-4 | EX-5 | EX-6 | CE-2 |
|---|---|---|---|---|---|
| Ts'2 (min) | 1.0 | 0.9 | 0.8 | 0.83 | 0.9 |
| T50 (min) | 1.7 | 1.4 | 1.5 | 1.36 | 1.4 |
| T90 (min) | 4.2 | 2.7 | 3.5 | 2.71 | 2.3 |
| tan d ML | 1.1 | 0.86 | 0.92 | 0.76 | 1.1 |
| tan d MH | 0.112 | 0.115 | 0.128 | 0.133 | 0.098 |
| Typical Physical Properties | | | | | |
| Tensile at break, MPa | 16.5 | 15.9 | 8.9 | 10.6 | 17.7 |
| 100% Modulus, MPa | 4.0 | 3.9 | 4.5 | 7.0 | 2.3 |
| Elongation at break, % | 324 | 324 | 291 | 271 | 318 |
| Hardness, Shore A | 80 | 79 | 85 | 87 | 67 |
| Specific gravity | 1.98 | 1.98 | 2.02 | 2.02 | 1.94 |
| Compression Set | | | | | |
| 70 hours@200° C. (25% deflection) | 23 | 23 | 31 | 30 | 21 |
| Plasma resistance | | | | | |
| $NF_3$ plasma weight loss (%) | 3.2 | 3.1 | 2.6 | 2.5 | 3.7 |
| $O_2$ plasma weight loss (%) | 0.69 | 0.68 | 0.67 | 0.7 | 0.69 |

Samples Prepared from a Partially-Fluorinated Elastomer (ELAST-C)

Portion 4. The latex of ELAST-C was blended with the latex of PFA-1 to produce a blended latex containing 80/20 weight ratio of the partially-fluorinated elastomer to the perfluorinated thermoplastic. The blended latex was coagulated using a 1.25 wt. % aqueous solution of $MgCl_2$, washed with deionized water and oven dried at 115° C. for 16 hours to form "Portion 4" used to prepare the following examples.

Example 7 (EX-7) was prepared by combining 100 grams of Portion 4 with 25 grams of PFA-3, 3 grams of a co-agent (1,3,5-Triallyl-1,3,5-triazine-2,4,6(1H,3H,5H)-trione (purity: 98%) available from Nippon Kasei, Tokyo Japan) and 1 gram of a peroxide curative (2,5-dimethyl-2,5-di(t-butylperoxy)-hexane (DBPH) (purity: 90%) available from Sigma-Aldrich, Milwaukee, WI, USA), and milling the composition on a two roll mill. The composition is summarized in Table 4.

Example 8 (EX-8) was prepared in the same manner, except 60 grams of PFA-3 were used. The resulting composition is summarized in Table 4.

Comparative Example 3 (CE-3) was prepared in the same manner, except no PFA-3 was used. The resulting composition is summarized in Table 4.

Portion 5. The latex of ELAST-C was blended with the latex of PFA-1 to produce a blended latex containing 64/36 weight ratio of the partially-fluorinated elastomer to the perfluorinated thermoplastic. The blended latex was coagulated using a 1.25 wt. % aqueous solution of $MgCl_2$, washed with deionized water and oven dried at 115° C. for 16 hours to form "Portion 5" used to prepare the following examples.

Example 9 (EX-9) was prepared by combining 100 grams of Portion 5 with 25 grams of PFA-3, 3 grams of a co-agent (1,3,5-Triallyl-1,3,5-triazine-2,4,6(1H,3H,5H)-trione (purity: 98%) available from Nippon Kasei, Tokyo Japan) and 1 gram of a peroxide curative (2,5-dimethyl-2,5-di(t-butylperoxy)-hexane (DBPH) (purity: 90%) available from Sigma-Aldrich, Milwaukee, WI, USA), and milling the composition on a two roll mill. The resulting composition is summarized in Table 4.

Comparative Example 4 (CE-4) was prepared in the same manner, except no PFA-3 was used. The resulting composition is summarized in Table 4.

TABLE 4

Compositions and test results using a partially fluorinated elastomer (ELAST-C).

|  | EX-7 | EX-8 | CE-3 | EX-9 | CE-4 |
|---|---|---|---|---|---|
| Formulation | | | | | |
| ELAST-C (from latex) | 80 | 80 | 80 | 64 | 64 |
| PFA-1 (from latex) | 20 | 20 | 20 | 36 | 36 |
| PFA-2 (from powder) | — | — | — | — | — |
| PFA-3 (from powder) | 25 | 60 | — | 28 | — |
| Co-agent | 3 | 3 | 3 | 3 | 3 |
| Peroxide curative | 1 | 1 | 1 | 1 | 1 |
| Weight % PFA based on total weight | | | | | |
| PFA-1 (%) | 16 | 16 | 20 | 22 | 36 |
| PFA-2 (%) | — | — | — | — | — |
| PFA-3 (%) | 20 | 34 | 0 | 28 | 0 |
| Total PFA-1 + PFA-3 (%) | 36 | 50 | 20 | 50 | 36 |
| Wt. ratio PFA-1:(PFA-2 or PFA-3) | 44:56 | 32:64 | 100:0 | 44:56 | 100:0 |
| Weight % fluorine of ELAST and PFA | 68.7 | 70.2 | 66.9 | 70.2 | 68.7 |

TABLE 4-continued

Compositions and test results using a partially fluorinated elastomer (ELAST-C).

|  | EX-7 | EX-8 | CE-3 | EX-9 | CE-4 |
|---|---|---|---|---|---|
| Cure rheology 15 min.@177° C. | | | | | |
| ML (dNm) | 1.2 | 4.4 | 0.2 | 5.5 | 1.4 |
| MH (dNm) | 22.6 | 34 | 13.1 | 35.8 | 21.4 |
| Delta torque (dNm) | 21.4 | 29.6 | 12.9 | 30.3 | 20 |
| Ts'2 (min) | 0.8 | 0.7 | 1 | 0.7 | 0.9 |
| T50 (min) | 1.2 | 1.1 | 1.3 | 1.1 | 1.2 |
| T90 (min) | 2.2 | 2.1 | 2.3 | 1.9 | 2.2 |
| tan delta ML | 1.0 | 0.8 | 1.9 | 0.7 | 0.9 |
| tan delta MH | 0.125 | 0.151 | 0.118 | 0.132 | 0.125 |
| Typical Physical Properties | | | | | |
| Tensile at break, MPa | 13.2 | 8.3 | 15.0 | 10.5 | 11.2 |
| 100% Modulus, MPa | 447 | 399 | 446 | 2.8 | 1.7 |
| Elongation at break, % | 1.9 | 2.9 | 1.3 | 409 | 413 |
| Hardness, Shore A | 70 | 78 | 60 | 78 | 71.4 |
| Specific gravity | 1.91 | 1.96 | 1.85 | 1.96 | 1.91 |
| Compression Set | | | | | |
| 70 hours@200° C. (25% deflection) | 36 | 39 | 35 | 39 | 35 |
| Plasma resistance | | | | | |
| $NF_3$ plasma weight loss (%) | 3.6 | 2.9 | 4.2 | 2.9 | 3.6 |
| $O_2$ plasma weight loss (%) | 0.8 | 0.8 | 0.75 | 0.77 | 0.75 |

As shown in these examples, by using the bi-modal distribution of PFA particle sizes, higher amounts of PFA could be included without sacrificing mechanical properties, while also avoiding the compression set failure mode. Such higher amounts of PFA also significantly improved the $NF_3$ plasma as summarized in Table 5. In this table, for each set of examples the 5 comparative example is set as the "base" for plasma resistance. The percent reduction is then calculated as (base plasma weight loss−example plasma weight loss)/(base plasma weight loss).

TABLE 5

Improvements in $NF_3$ plasma resistance.

|  | CE-1 | EX-1 | EX-2 |
|---|---|---|---|
| Elastomer | A | A | A |
| PFA-1 (latex, 80 nanometers) - wt % | — | 17.4 | 16 |
| PFA-2 (powder, 27.5 micrometers) - wt % | 30 | 13 | 20 |
| PFA-3 (powder, 27.5 micrometers) - wt % | — | — | — |
| Total PFA wt. % | 30 | 30.4 | 36 |
| $NF_3$ plasma weight loss (%) | 2.1 | 2 | 2.1 |
| Reduction in $NF_3$ plasma weight loss | Base | 5% | 0% |

|  | CE-2 | EX-3 | EX-4 | EX-5 | EX-6 |
|---|---|---|---|---|---|
| Elastomer | B | B | B | B | B |
| PFA-1 (80 nanometers) - wt % | 20 | 16 | 16 | 16 | 16 |
| PFA-2 (27.5 micrometers) - wt % | — | 20 | — | 34 | — |
| PFA-3 (27.5 micrometers) - wt % | — | — | 20 | — | 34 |
| Total PFA wt. % | 20 | 36 | 36 | 50 | 50 |
| $NF_3$ plasma weight loss (%) | 3.7 | 3.2 | 3.1 | 2.6 | 2.5 |
| Reduction in $NF_3$ plasma weight loss | Base | 14% | 16% | 30% | 32% |

TABLE 5-continued

Improvements in $NF_3$ plasma resistance.

|  | CE-3 | EX-7 | EX-8 | CE-4 | EX-9 |
|---|---|---|---|---|---|
| Elastomer | C | C | C | C | C |
| PFA-1 (80 nanometers) - wt % | 20 | 16 | 16 | 36 | 22 |
| PFA-2 (27.5 micrometers) - wt % | — | — | — | — | — |
| PFA-3 (27.5 micrometers) - wt % | — | 20 | 34 | — | 28 |
| Total PFA wt. % | 20 | 36 | 50 | 36 | 50 |
| $NF_3$ plasma weight loss (%) | 4.2 | 3.6 | 2.9 | 3.6 | 2.9 |
| Reduction in $NF_3$ plasma weight loss | Base | 14% | 31% | Base | 19% |

In the following claims, the Latex Size Procedure and the Powder Size Procedure refer to the methods described in the example section.

What is claimed is:

1. An elastomer composition comprising a curable fluoroelastomer and at least 25% by weight of perfluorinated thermoplastic fillers based on the total weight of the fluoroelastomer and the perfluorinated thermoplastic fillers; wherein the perfluorinated thermoplastic fillers comprise a first perfluorinated thermoplastic filler having a first d50 particle size of 10 to 250 nanometers as measured according to the Latex Size Procedure, and a second perfluorinated thermoplastic filler having a second d50 particle size of 5 to 500 micrometers as measured according to the Powder Size Procedure.

2. The composition of claim 1 wherein the perfluorinated thermoplastic fillers comprise 30 to 70% by weight of the first perfluorinated thermoplastic filler and 30 to 70% by weight of the second perfluorinated thermoplastic filler, based on the total weight of the perfluorinated thermoplastic fillers.

3. The composition of claim 2, wherein the perfluorinated thermoplastic fillers comprise 40 to 60% by weight of the first perfluorinated thermoplastic filler and 40 to 60% by weight of the second perfluorinated thermoplastic filler, based on the total weight of the perfluorinated thermoplastic fillers.

4. The composition of claim 1, comprising 30 to 60% by weight of the perfluorinated thermoplastic fillers.

5. The composition of claim 1, wherein the first d50 particle size is no greater than 150 nanometers.

6. The composition of claim 5, wherein the first d50 particle size is at least 30 nanometers.

7. The composition of claim 1, wherein the second d50 particle size is at least 10 micrometers.

8. The composition of claim 7, wherein the second d50 particle size is between 20 and 150 micrometers.

9. The composition of claim 1, wherein the first perfluorinated thermoplastic comprises at least 99 mole % of tetrafluoroethylene and at least 0.5 mole % of at least one perfluorinated alkyl ether.

10. The composition of claim 9, wherein the at least one perfluorinated alkyl ether of the first perfluorinated thermoplastic comprises at least one perfluorinated alkyl vinyl ether, optionally selected from the group consisting of PMVE, PEVE, PPVE, and combinations thereof.

11. The composition of claim 9, wherein the at least one perfluorinated alkyl ether of the first perfluorinated thermoplastic comprises at least one perfluorinated alkyl allyl ether, optionally wherein the perfluorinated alkyl allyl ether is perfluoromethyl allyl ether.

12. The composition of claim 1, wherein the second perfluorinated thermoplastic comprises at least 99 mole % of tetrafluoroethylene and at least 0.5 mole % of at least one perfluorinated alkyl ether.

13. The composition of claim 12, the at least one perfluorinated alkyl ether of the second perfluorinated thermoplastic comprises at least one perfluorinated alkyl vinyl ether, optionally selected from the group consisting of PMVE, PEVE, PPVE, and combinations thereof.

14. The composition of claim 12, wherein the at least one perfluorinated alkyl ether of the second perfluorinated thermoplastic comprises at least one perfluorinated alkyl allyl ether, optionally wherein the perfluorinated alkyl allyl ether is perfluoromethyl allyl ether.

15. The composition of claim 1, wherein the curable fluoroelastomer is a perfluoroelastomer.

16. The composition of claim 15, wherein the perfluoroelastomer is a copolymer comprising 60 to 70 mole % tetrafluoroethylene, 30 to 40 mole % of at least one of a perfluoroalkyl vinyl ether and a perfluoroalkyl allyl ether, and 0.5 to 3 mole % of a cure site monomer.

17. The composition of claim 1, wherein the curable fluoroelastomer is a partially-fluorinated elastomer.

18. The composition of claim 17, wherein the partially-fluorinated elastomer is copolymer of tetrafluoroethylene, hexafluoropropylene, vinylidene fluoride, and a cure site monomer.

19. The composition of claim 17, wherein the partially-fluorinated elastomer is copolymer of tetrafluoroethylene, vinylidene fluoride, at least one of an alkyl vinyl ether and an alkoxy vinyl ether, and a cure site monomer.

20. A method of preparing a composition comprising a curable fluoroelastomer and at least 25% by weight of perfluorinated thermoplastic fillers based on the total weight of the fluoroelastomer and the perfluorinated thermoplastic fillers; wherein the perfluorinated thermoplastic fillers comprise a first perfluorinated thermoplastic filler having a first d50 particle size of 10 to 250 nanometers as measured according to the Latex Size Procedure, and a second perfluorinated thermoplastic filler having a second d50 particle size of 5 to 500 micrometers as measured according to the Powder Size Procedure, the method comprising blending a first latex comprising the curable fluoroelastomer and a second latex comprising the first perfluorinated thermoplastic filler to form a latex blend; coagulating and drying the latex blend to form a first portion of the composition; and milling the second perfluorinated thermoplastic filler into the first portion to form the composition.

* * * * *